United States Patent [19]
Higgins

[11] Patent Number: 5,533,237
[45] Date of Patent: Jul. 9, 1996

[54] GROMMET FASTENER ASSEMBLY FOR AUTOMOBILES

[75] Inventor: Lawrence J. Higgins, Sterling Heights, Mich.

[73] Assignee: Emhart, Inc., Newark, Del.

[21] Appl. No.: 304,446

[22] Filed: Sep. 12, 1994

[51] Int. Cl.$^6$ .............................. A44B 17/00; F16B 19/00
[52] U.S. Cl. .................. 24/289; 24/293; 24/297; 411/508
[58] Field of Search .......................... 24/289, 297, 295, 24/292, 293; 411/508, 510, 913

[56] References Cited

U.S. PATENT DOCUMENTS

| | | | |
|---|---|---|---|
| 2,946,612 | 7/1960 | Ahlgren | 411/510 |
| 4,133,246 | 1/1979 | Small | 411/913 |
| 4,250,599 | 2/1981 | Nagashima et al. | 24/297 |
| 4,402,118 | 9/1983 | Benedetti | 24/295 |
| 4,865,505 | 9/1989 | Okada | 411/508 |
| 5,193,961 | 3/1993 | Hoyle et al. | 411/508 |

FOREIGN PATENT DOCUMENTS

| | | | |
|---|---|---|---|
| 0149312 | 2/1982 | Japan | 411/508 |
| 0884123 | 12/1961 | United Kingdom | 24/297 |

*Primary Examiner*—Victor N. Sakran
*Attorney, Agent, or Firm*—Edward D. Murphy

[57] ABSTRACT

A fastener assembly for fastening an interior panel to an exterior or body panel of an automobile comprising a grommet of plastic material that forms a non-porous seamless bathtub-like enclosure surrounding a metal clip retainer member which is secured within the interior thereof; the retainer-grommet is designed to snap-fit into a hole in the body panel of an automobile. A depending lug or prong from the interior panel of the automobile is provided with an enlarged tip that cooperates with the metal clip retainer so that the prong can be pushed into a snap-fit relationship with the metal clip member within the sealed enclosure of the grommet or by pulling can be removed therefrom.

3 Claims, 2 Drawing Sheets

GROMMET FASTENER ASSEMBLY FOR AUTOMOBILES

BACKGROUND OF THE INVENTION

The present invention relates to a fastener assembly for fastening an automobile interior part, that is, upholstery or trim material, to selected areas of a body panel part.

Presently, such fasteners usually employ two or three elements for joining or fastening a depending member of the interior part or panel (trim or upholstery) to an aperture in the body panel member of the automobile. For this purpose a grommet or retainer member generally in the form of an oblong receptacle is designed to receive a spring clip member, which assembly is inserted into the aperture of a body panel in a snap-fit like manner. A depending member of the interior panel is then inserted into the clip member within the grommet assembly and is retained thereby. Alternatively, the clip member, the depending portion of the interior panel and the grommet assembly can be united and then inserted as a single unit into the oblong hole in the body panel member in a snap-fit manner.

Such conventional fastener arrangements as above described perform as one-way fasteners; that is, once they are installed they are not intended to be removed without incurring damage to the depending prong member of the interior part that is fastened to the grommet assembly, since the metal retaining clip is designed to cut or gouge the softer plastic material of the prong member for maximum holding or pull-down power. Consequently it is difficult to remove such fasteners when it is desirable to service or replace interior parts or panels of the automobile. Also, the aforementioned grommet serves merely as a gripping receptacle for the clip and prong part of the assembly and for this purpose is provided with pliant leg members cut out of the side walls thereof for facilitating a snap-fit with the oblong hole in the body panel member to which it is normally fitted. Because the grommet is defined by slots and apertures, owing to the cut out portions, the grommet is free to pass moisture and fluid from the exterior of the body panel to the interior of the fastener assembly, thus hastening the progress of rust and corrosion between the metal parts of the clip member, as well as allowing leakage of fluid into the interior of the automobile.

OBJECTS AND SUMMARY OF THE INVENTION

It is the primary purpose and principle object of the present invention to address the aforementioned deficiencies of conventional fastener assemblies used in automobiles and provide, therefore, a novel fastener assembly which can be removed without damaging the fastener parts or the interior parts or panels of the automobile when servicing or repair is required.

It is another object of the present invention to provide a fastener assembly for automobiles, particularly a retainer and grommet assembly which is virtually leak-proof and thus prevents moisture, fluid or dirt passing through the fastener to the interior of the automobile.

It is yet another object of the present invention to provide a grommet fastener grommet assembly which is simple and efficient in design, uses a minimum number of moving parts, is virtually indestructible and can be used to fasten as well as unfasten interior parts or panels of an automobile—such as upholstery or trim—to a body panel member.

According to a preferred embodiment of the invention there is provided a grommet of plastic material which forms a non-porous seamless bathtub-like enclosure about a metal clip member which is secured therein; the assembly is designed to snap-fit into a hole in the body panel of an automobile. A depending lug or prong from the interior panel of the automobile is provided with a diamond-shaped tip that cooperates with the metal clip retained by the grommet so that the prong can be pushed into a snap-fit relationship with the metal clip member within the grommet or by pulling can be removed therefrom.

The invention will be better understood and further objects and advantages thereof will become more apparent from the ensuing detailed description of the preferred embodiment taking in conjunction with the drawings.

DETAILED DESCRIPTION OF THE PREFERRED EMBODIMENT

Figure 1:
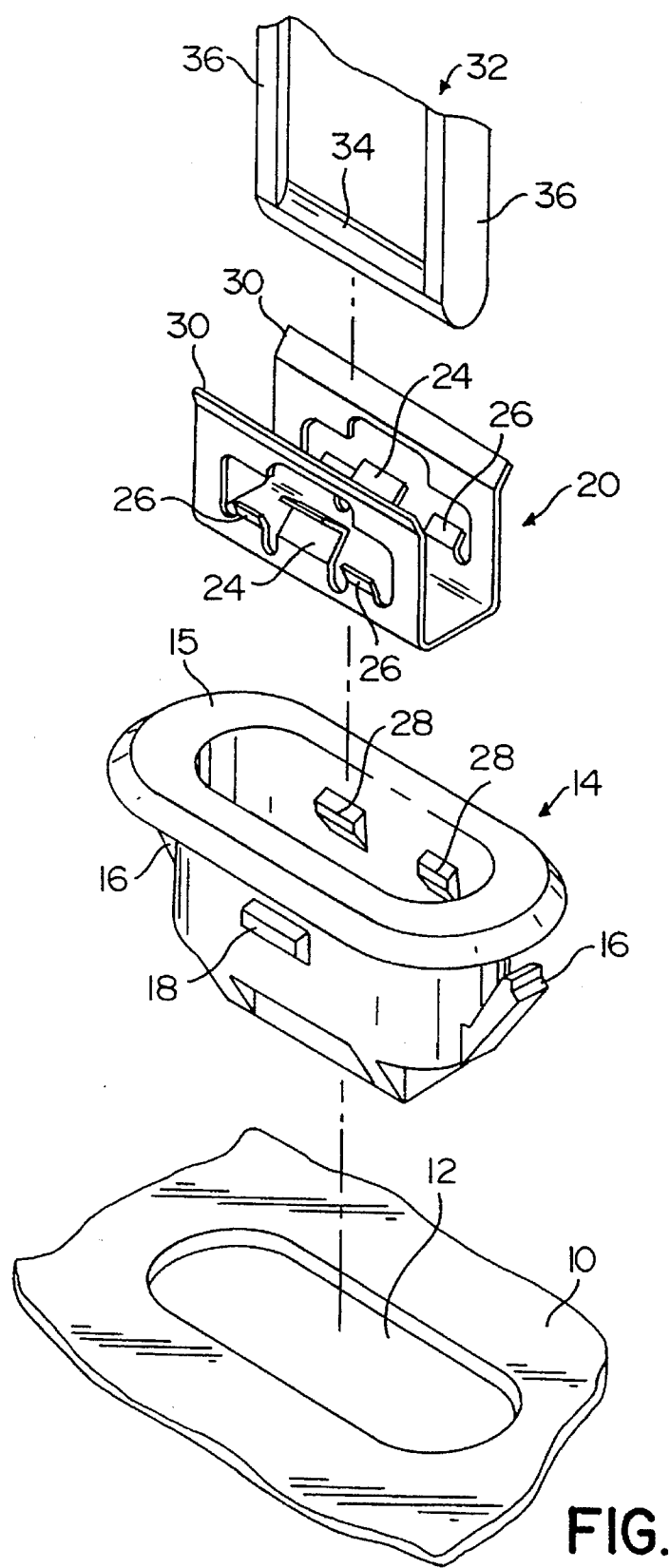
FIG. 1 is a schematic exploded perspective view of the grommet fastener assembly in relation to a body panel of an automobile according to the invention.
Figure 2:
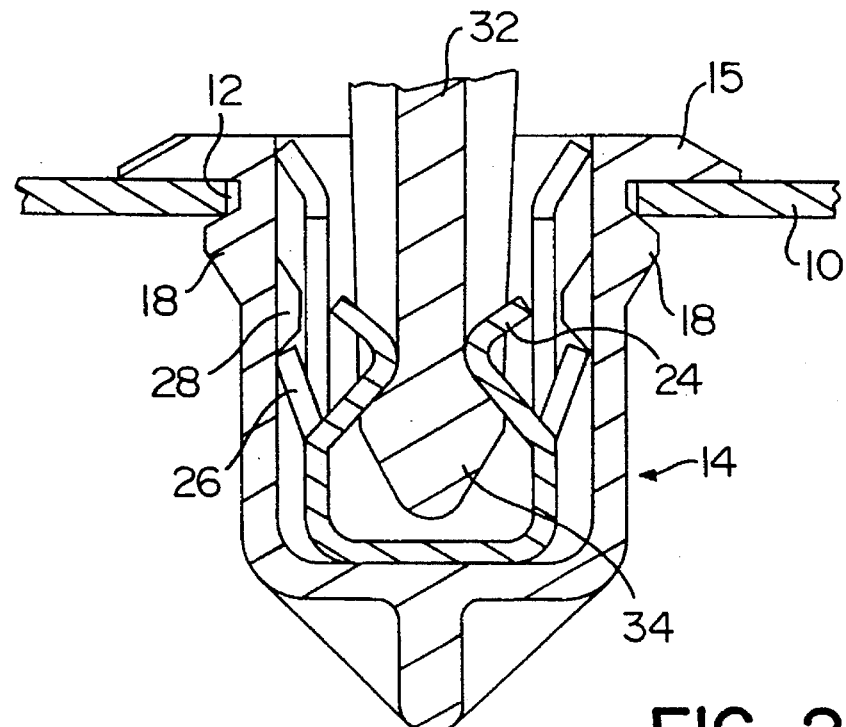
FIG. 2 a schematic partial cross-section of the grommet fastener with the retainer therein shown in operation according to the invention.

Referring now to FIG. 1 there is shown an exterior automobile body panel member 10 with an aperture 12 therein, it being understood that such a panel member would have several such holes aligned along side a door frame or other interior panel of an automobile. A grommet member 14 in the form of a hollow enclosure or vessel is composed of a rigid plastic material, a synthetic resin, for example, and is shown to have pliable end leg members 16 and side protuberant members 18 of conventional construction for fitting under the edges of the oblong hole or aperture 12, into which the grommet is fitted, as best shown in FIG. 2. Together with the lip portion 15 of the grommet which rides along the top portion of the rim of the oblong hole 12, the pliable end-leg members 16 and the protuberant side members 18 (which may be molded in place when the grommet is formed from a suitable molding process) engage the underside of the rim to thereby retain the grommet in a snap-fit like manner with respect to the aperture 12, again as shown in FIG. 2.

According to one aspect of the invention, the grommet 14 is seen to have completely enclosed sidewalls, endwalls and a bottom wall (see FIG. 2) so as to form a non-porous seamless enclosure, like a bathtub, for retaining the metal clip member 20 (see FIG. 2) to be described below.

The U-shaped metal clip member 20 has pliable sidewalls 22, and each side wall has a set of cut-out portions, 24 and 26. Cut-out portion 24 is formed as an angled leg whose apex extends into the interior space of the clip member, whereas the cut-out portions 24 on either side of the angled legs 24 are straight sided members which angle or extend outwardly away from the plane of the sidewalls and away from the interior of the clip member. The opposing cut-out portions 24 together can be described as the prong retention members for the depending prong of the automobile interior panel, to be described shortly, and the cut-out portions 26 can be described as retention members that cooperate with the underside of interior abutment members 28 on the interior sidewalls of the grommet, also molded in place (see FIG. 2). Lastly, the metal clip member 20 is seen to have outwardly flared flange portions 30 for facilitating reception of the prong member.

Figure 3:
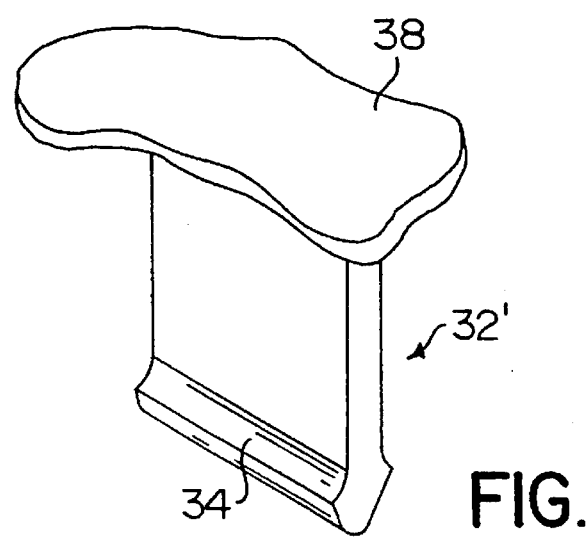
FIG. 3 is a schematic perspective of an alternate embodiment of a component part of the retainer assembly.

An elongated prong member 32 is shown positioned above the metal clip member in FIG. 1 and positioned in place within the metal clip member in FIG. 2. The prong 32 depends from an interior automobile panel 38, such as used for upholstery or trim, not shown. Critical to the construction of the prong member 32 and according to another feature of the invention is the diamond-shaped cross-section or nodule portion 34 of the lower part of the prong. The prong itself may be a solid piece 32', as shown in FIGS. 2 and 3, or for purposes of conserving weight may be hollow; that is, composed of spaced apart leg members 36, as shown in FIG. 1.

Referring to FIG. 2, the assembled fastener is shown positioned in the aperture 12 of the body panel 10. It will be seen that the elongated prong member 32 has its diamond-shaped lower nodule portion 34 disposed behind or below the angled retainer members 24. It will be seen that the prong 32, together with the interior panel of the automobile 38 to which it is molded or attached, can be readily removed by pulling that part of the interior panel away from the exterior body panel, thus causing the diamond-shaped nodule portion 34 to squeeze past the bias of the angled retainer members 24. The prong 32 can be reinserted into the metal clip member 20 so that the diamond-shaped nodule portion 34 again squeezes past the angled retainer members 24 into a snap-fit, once repair or servicing is completed.

Because the grommet 14 is formed as a non-porous seamless enclosure open only at its top end where the prong 32 is inserted, the grommet will act as a seal between the exterior of the body panel 10 and the interior of the automobile and so prevent the passage of moisture, fluid and dirt through the fastener assembly and thus keep the metal parts therein clean and free from corrosion and rust.

The foregoing relates to a preferred exemplary embodiment of the present invention, it being understood that other methods and variants thereof are possible within the scope of the invention, the latter being defined by the appended claims.

What is claimed and desired to be secured by Letters Patent of the United States is:

1. A fastener assembly for securing an interior panel associated with upholstering material to an exterior body panel of an automobile comprising, an elongated member depending from said interior panel and having a retention nodule thereon, a retainer member comprising a generally U-shaped spring metal member having a first pair of arm members shaped to cooperate with said retention nodule to thereby releasably secure said elongated member to said retainer member, and a closed, cup-shaped grommet formed of a rigid non-porous seamless material and having a flange for mounting on the rim of an aperture in said exterior body panel of said automobile and further having exterior pliable leg members for engaging the underside of the rim of said aperture for effecting a snap-fit therewith, said grommet having generally the same peripheral dimension as said aperture in a plane coplanar with the plane of said aperture, said grommet having interior tab means for securing said retainer member within the interior thereof, and said retainer member further having a second pair of arm members extending upwardly to engage said tab means, said grommet thereby forming a closed enclosure surrounding said retainer member, whereby said grommet acts as a seal against the passage of liquid into said interior panel of said automobile.

2. A fastener assembly according to claim 1, wherein said retainer member is a metal U-shaped clip and said spring-biased means include, 1) inwardly extending cut-out portions in respective sidewalls of said U-shaped clip for engaging said retention nodule and, 2) outwardly extending cut-out portions for engaging the undersides of said interior tab means in said grommet.

3. A fastener assembly for securing an interior panel associated with upholstering material to an exterior body panel of an automobile comprising, an elongated member depending from said interior panel and having an enlarged diamond-shaped portion at the free end thereof, a retainer member having opposed spring-biased arm members biased apart by said enlarged portion of said depending member when said depending member is partially inserted into said retainer member and wherein said spring-biased arm members close together behind said enlarged portion when said elongated member is fully inserted into said retainer member to thereby secure said elongated member to said retainer member until such time as said elongated member is pulled away from said retainer member and said spring-biased arm members are caused to be biased apart to release said elongated member from said retainer member, and a closed, cup-shaped grommet formed of a rigid non-porous seamless material and having a flange for mounting on the rim of an aperture in said exterior body panel of said automobile and further having exterior pliable leg members for engaging the underside of the rim of said aperture for effecting a snap-fit therewith, said grommet having generally the same peripheral dimension as said aperture in a plane coplanar with the plane of said aperture, said grommet having interior tab means for securing said retainer member within the interior thereof, and said retainer member further having a second pair of arm members extending upwardly to engage said tab means, said grommet thereby forming a closed enclosure surrounding said retainer member, whereby said grommet acts as a seal against the passage of liquid into said interior panel of said automobile.

\* \* \* \* \*